United States Patent
Yang et al.

(10) Patent No.: US 7,949,242 B2
(45) Date of Patent: May 24, 2011

(54) LENS COVER ASSEMBLY AND PORTABLE ELECTRONIC DEVICE USING THE SAME

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/564,161

(22) Filed: Sep. 22, 2009

(65) Prior Publication Data

US 2010/0183290 A1    Jul. 22, 2010

(30) Foreign Application Priority Data

Dec. 31, 2008  (CN) .......................... 2008 1 0306756

(51) Int. Cl.
*G03B 17/08* (2006.01)

(52) U.S. Cl. ........... 396/29; 359/511; 348/373; 396/448
(58) Field of Classification Search .................. 396/448, 396/25, 29; 359/511, 513; 348/373
See application file for complete search history.

(56) References Cited

U.S. PATENT DOCUMENTS

| | | | | |
|---|---|---|---|---|
| 3,133,140 | A * | 5/1964 | Winchell | 359/511 |
| 6,191,899 | B1 * | 2/2001 | Fuchs | 359/894 |
| 2005/0146641 | A1 * | 7/2005 | Cheng | 348/373 |
| 2009/0074400 | A1 * | 3/2009 | Machida et al. | 396/448 |

* cited by examiner

Primary Examiner — W. B. Perkey
Assistant Examiner — Fang-Chi Chang
(74) Attorney, Agent, or Firm — Steven M. Reiss

(57) ABSTRACT

A lens cover assembly comprises a lens cover and a water absorption portion. The lens cover has a transparent portion located in a center portion thereof. The water absorption portion is mounted to the lens cover surrounding the transparent portion.

19 Claims, 5 Drawing Sheets

LENS COVER ASSEMBLY AND PORTABLE ELECTRONIC DEVICE USING THE SAME

BACKGROUND

1. Technical Field

The exemplary disclosure generally relates to lens cover assemblies and portable electronic device using the lens cove assemblies.

2. Description of Related Art

The portable electronic device, such as mobile phone, usually has a camera module for taking photos. Typically, the camera module is disposed in a hole defined in an outer shell of the portable electronic device, and then a lens cover is used to cover the camera module, so protecting the camera module from damaging.

However, a slight gap is formed between the lens cover and the outer shell. If the portable electronic device becomes wet, water and/or vapor could penetrate through the gap and the hole into the portable electronic device, affecting the circuit board of the portable electronic device. In addition, dust entering into the portable electronic device can also degrade performance.

Therefore, there is a room for improved in the arts.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary lens cover assembly and portable electronic device using the lens cove assembly. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
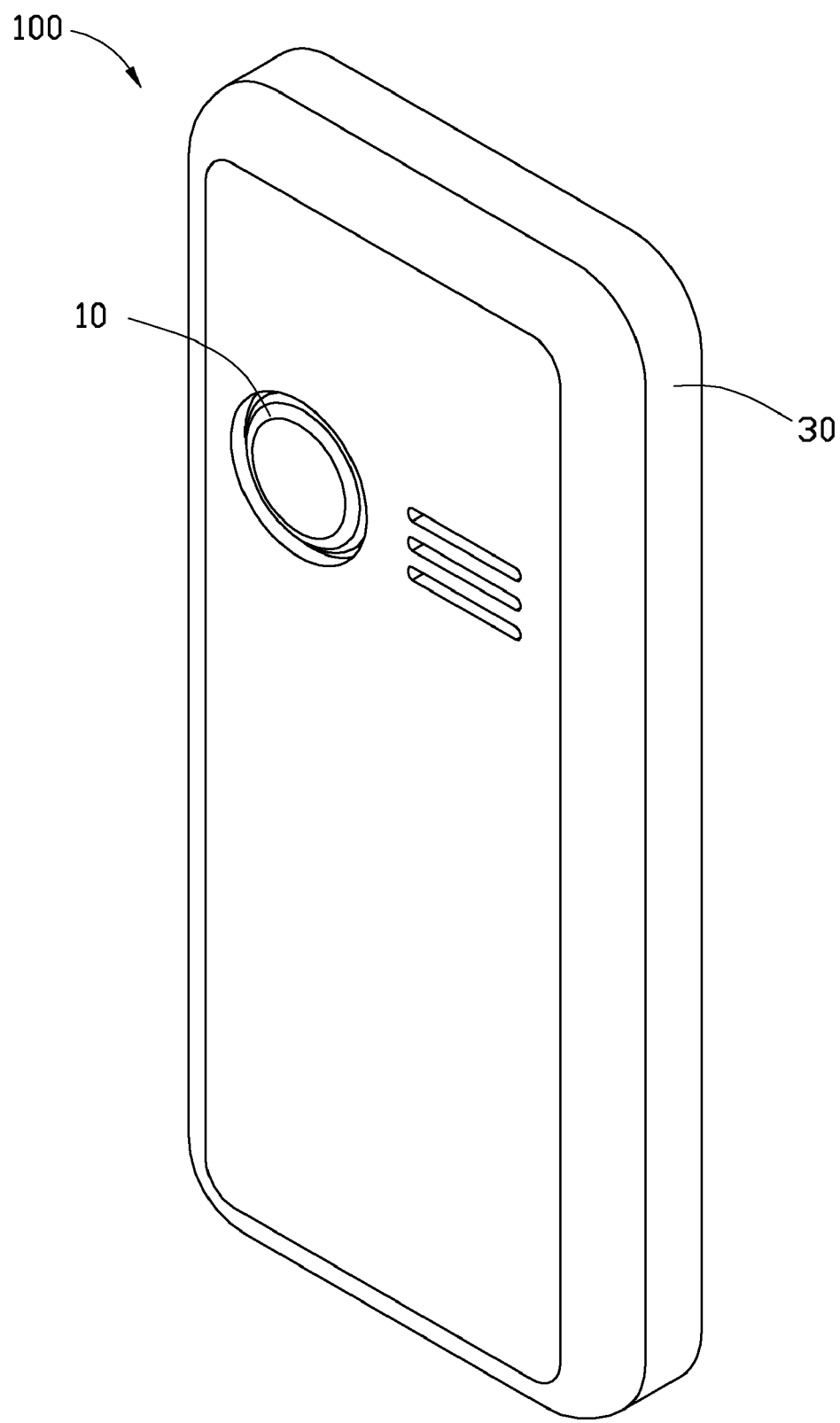
FIG. 1 is an assembled view of an exemplary embodiment of a lens cover assembly used in a portable electronic device including a lens cover assembly, an adhesive member and a housing.
Figure 2:
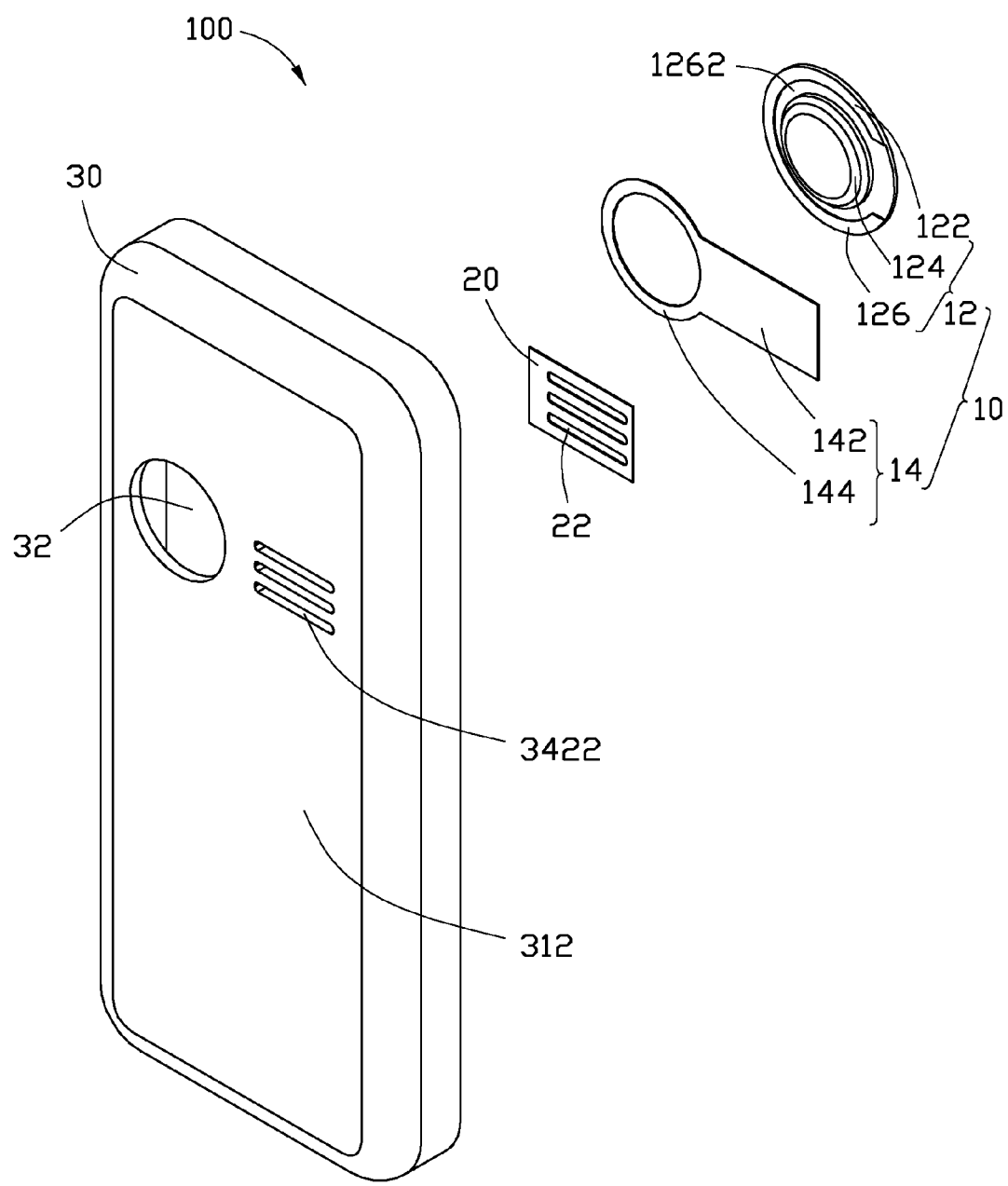
FIG. 2 is an exploded view of the portable electronic device shown in FIG. 1.

Referring to FIGS. 1 and 2, an exemplary lens cover assembly 10 used in a portable electronic device 100 for protecting a camera module (not shown) is shown. The portion of the portable electronic device 100 includes a lens cover assembly 10, an adhesive member 20, and a housing 30. The adhesive member 20 attaches the lens cover assembly 10 to the housing 30.

The lens cover assembly 10 includes a transparent lens cover 12 and a gasket 14 mounted to the lens cover 12. The lens cover 12 is preferably formed from rigid material, and has a base plate 122 and a clear, transparent portion 124 that forms a lens for viewing the camera module. The base plate 122 may be circular, the transparent portion 124 is formed in a center portion of the base plate 122. The base plate 122 further include a flange 126 surrounding the transparent portion 124 and has an annular slot 1262 defined in the flange 126 surrounding the transparent portion 124. The slot 1262 is configured for accommodating the gasket 14.

The gasket 14 is a flexible and water absorption sheet, may be absorbent cotton or resin. The gasket 14 includes a main body 142 and an circular seal 144 situated at one end of the main body 142. The adhesive member 20 has the same shape and size as the main body 142, and defines a plurality of channels 22. The adhesive member 20 is used to adhere the gasket 14 to the housing 30.

Figure 3:
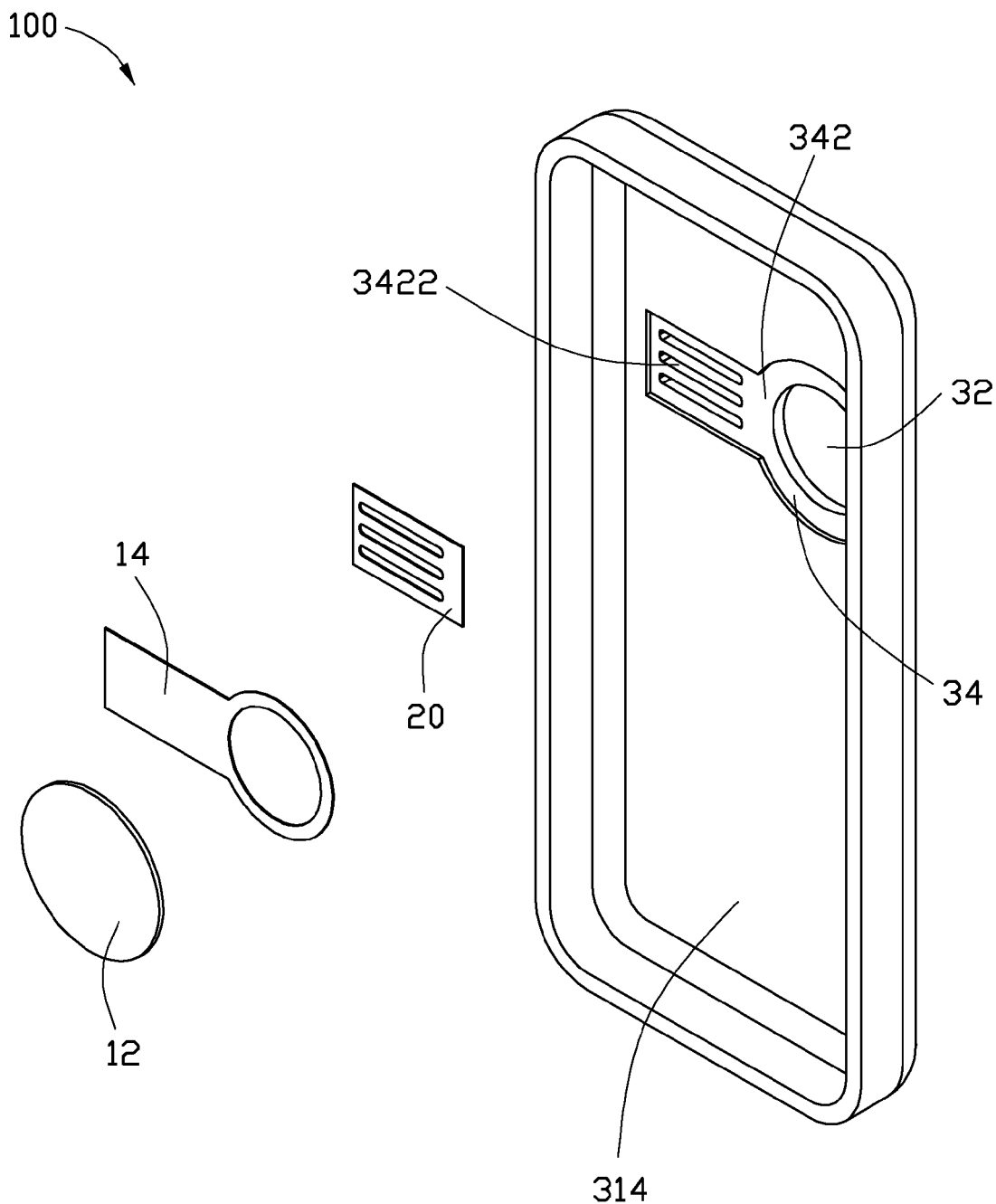
FIG. 3 is similar to FIG. 2, but showing the portable electronic device in another aspect.

Referring to FIG. 3, the housing 30 defines an opening 32 providing a passage between a housing outer surface 312 and a housing inner surface 314. The opening 32 has a shape and size corresponding the transparent portion 124 of the lens cover 12, and the transparent portion 124 protrudes outwardly from the housing 30 by the opening 32. The housing 30 further defines a recessed portion 34 in the housing inner surface 314, so a bottom wall 342 is formed in the recessed portion 34. The recessed portion 34 is configured to accommodate the gasket 14. The housing 30 further defines a plurality of pores 3422 through the bottom wall 342 and the housing outer surface 312 corresponding to the channels 22 of the adhesive member 20.

Figure 4:
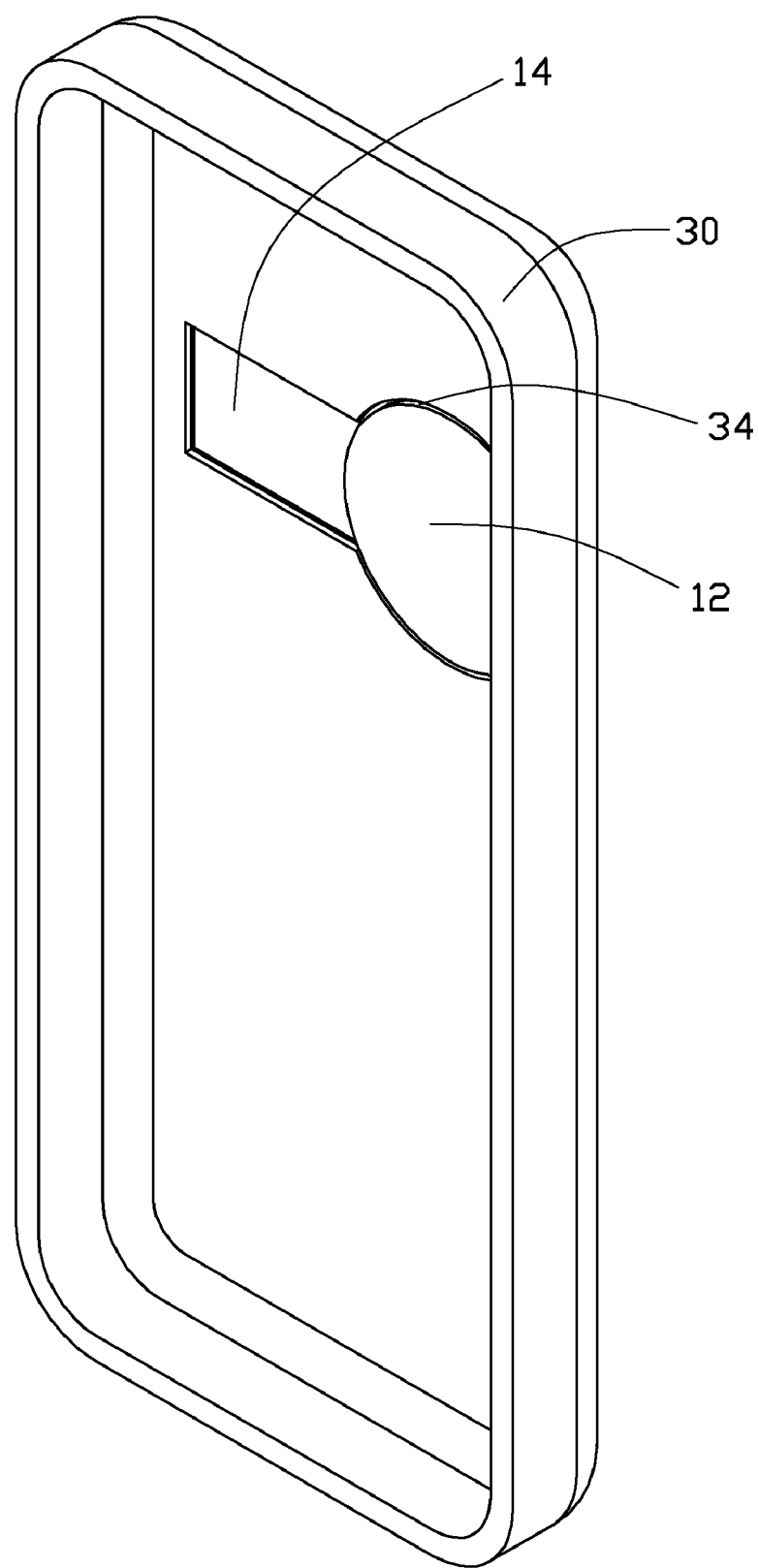
FIG. 4 is similar to FIG. 1, but showing the portable electronic device in another aspect.
Figure 5:
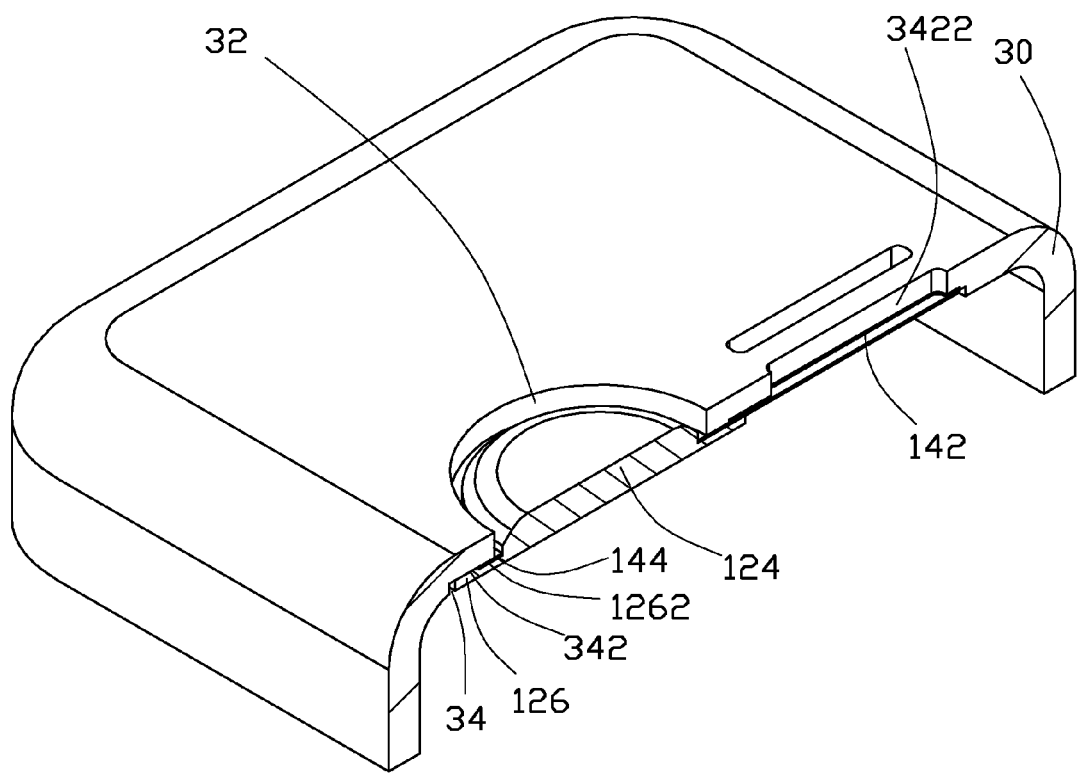
FIG. 5 is a partially enlarged and cross-sectional view of the battery cover latching assembly shown in FIG. 1.

Referring to FIGS. 4 and 5, when the portion of the portable electronic device is fully assembled, the seal 144 of the gasket 14 is mounted between the slot 1262 of the lens cover 12 and the recessed portion 34 of the housing 30. Thereby yielding a water/dust seal 144 or water absorption portion between the lens cover 12 and the housing 30. As a result, the portable electronic device 100 prevents water and/or dust entering via the seal 144 and damaging electronic elements (not shown) inside the portable electronic device 100. The main body 142 of the gasket 14 is adhered by the adhesive member 20 to the bottom wall 342 of the housing 30 such that the main body 142 is seated in the recessed portion 34 within the housing 30. Additionally, the channels 22 of the adhesive member 20 are aligned with the holes 3422 of the housing 30, such that the main body 142 corresponding to the channels 22 are externally exposed. The main body 142 functions as a water draining portion for absorbing water on the seal 144. Water on the main body 142 is then left vaporized and/or drained out of the housing 30 from the channels 22 and the holes 3422. Furthermore, the base plate 122 is mounted (hot melted) to the housing inner surface 314 with the transparent portion 124 accommodated in the opening 32.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens cover assembly, comprising:
   a lens cover, the lens cover having a transparent portion located in a center portion thereof; and
   a gasket, the gasket portion mounted to the lens cover and surrounding the transparent portion;
   wherein the gasket is a flexible and water absorption sheet.

2. The lens cover assembly as claimed in claim 1, wherein the gasket is absorbent cotton or resin.

3. The lens cover assembly as claimed in claim 1, wherein the lens cover has a slot defined therein surrounding the transparent portion, the gasket includes a main body and a seal situated in an end of the main body, the seal is accommodated in the slot surrounding the transparent portion.

4. The lens cover assembly as claimed in claim 3, wherein the lens cover further includes a flange surrounding the transparent portion, the slot is defined in the flange.

5. A lens cover assembly, comprising:
   a lens cover, the lens cover having a transparent portion located in a center portion thereof; and
   a water absorption portion, the water absorption portion mounted to the lens cover surrounding the transparent portion.

6. The lens cover assembly as claimed in claim 5, wherein the water absorption portion is absorbent cotton or resin.

7. The lens cover assembly as claimed in claim 5, wherein the water absorption portion is a flexible and water absorption sheet.

8. The lens cover assembly as claimed in claim 5, wherein the lens cover assembly further includes a water draining portion connecting to the water absorption portion, the water draining portion is configured to absorb and drain water on the water absorption portion.

9. The lens cover assembly as claimed in claim 8, wherein the water draining portion is absorbent cotton or resin.

10. The lens cover assembly as claimed in claim 8, wherein the water draining portion is a flexible and water absorption sheet.

11. The lens cover assembly as claimed in claim 5, wherein the lens cover has a slot defined therein surrounding the transparent portion, the water absorption portion is accommodated in the slot surrounding the transparent portion.

12. The lens cover assembly as claimed in claim 11, wherein the lens cover further includes a flange surrounding the transparent portion, the slot is defined in the flange.

13. A portable electronic device, comprising:
   a housing; and
   a lens cover assembly, the lens cover assembly mounted to the housing, the lens cover assembly comprising:
   a lens cover, the lens cover having a transparent portion located in a center portion thereof; and
   a water absorption portion, the water absorption portion mounted to the lens cover surrounding the transparent portion and the housing.

14. The portable electronic device as claimed in claim 13, wherein the lens cover assembly further includes a water draining portion connecting to the water absorption portion, the water draining portion is configured to absorb and drain water on the water absorption portion.

15. The portable electronic device as claimed in claim 14, wherein the water absorption portion is mounted to the housing, the housing has a plurality of holes defined therethrough corresponding to the water absorption portion, the holes are configured to externally expose the water absorption portion.

16. The portable electronic device as claimed in claim 15, wherein the portable electronic device further includes an adhesive member, the water absorption portion is adhered to the housing by the adhesive member, the adhesive member has a plurality of channels defined therethrough corresponding to the holes.

17. The lens cover assembly as claimed in claim 13, wherein the housing has a recessed portion defined therein and an opening defined therethrough corresponding to the transparent portion, the transparent portion is accommodated in the opening, the water absorption portion is mounted to the recessed portion of the housing.

18. The lens cover assembly as claimed in claim 13, wherein the lens cover assembly has a slot defined therein surrounding the transparent portion, the water absorption portion is accommodated in the slot surrounding the transparent portion.

19. The lens cover assembly as claimed in claim 13, wherein the water absorption portion is a flexible and water absorption sheet.

* * * * *